Jan. 12, 1937.  W. L. JONES  2,067,490
TIRE PRESSURE INDICATOR
Filed Jan. 8, 1936
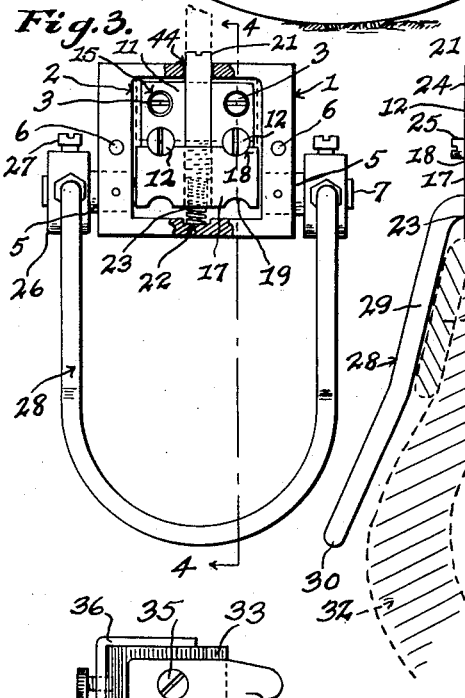
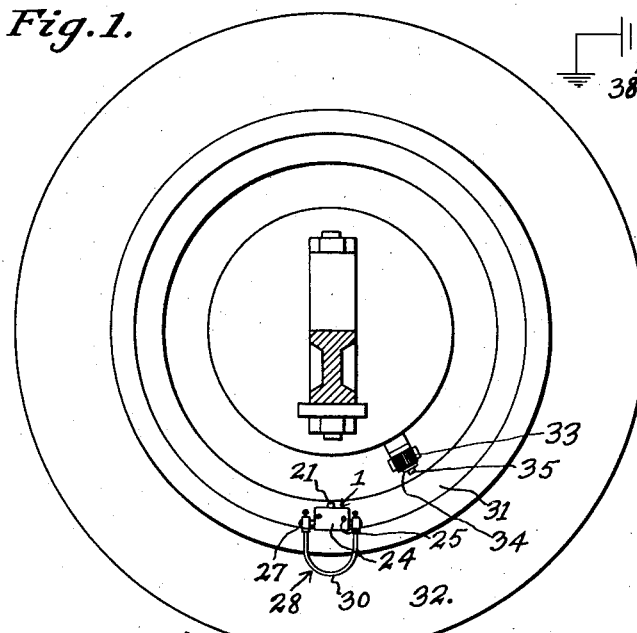
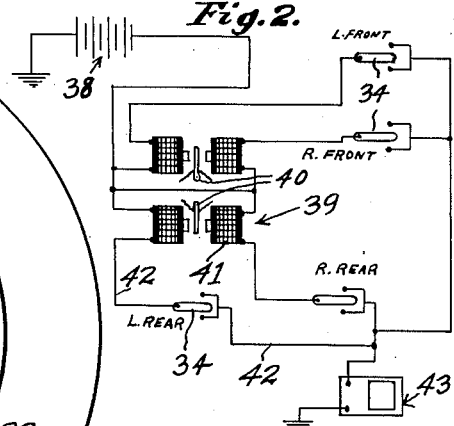
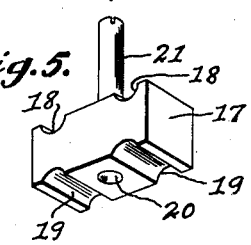
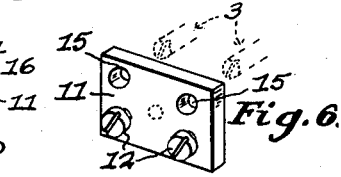
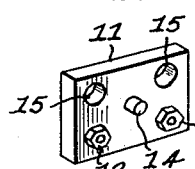
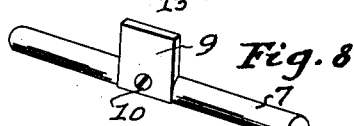
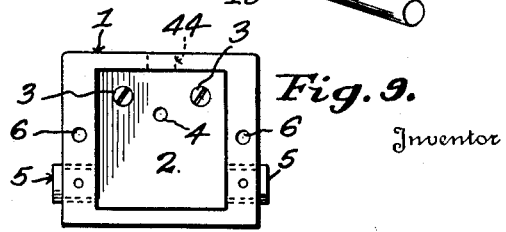
Inventor
WALTER L. JONES
By Albert E. Dieterich
Attorney Patented Jan. 12, 1937

2,067,490

UNITED STATES PATENT OFFICE 2,067,490

TIRE PRESSURE INDICATOR

Walter L. Jones, St. Louis, Mo.

Application January 8, 1936, Serial No. 58,179

8 Claims. (Cl. 200—58)

My invention, which relates to signalling devices and particularly to those for giving a suitable signal when the air pressure in one or more of the pneumatic tires of a motor vehicle drops to a point where further driving would cause injury to the tire or tires, has for its principal object to simplify and improve the device which constitutes the subject-matter of United States Patent No. 1,857,551 issued May 10, 1932.

Further it is an important object of the present invention to eliminate friction by so designing the actuating arm that it does not engage with the tire when the tire is properly inflated, as do the rollers 19 of the arms 18 of my said Letters Patent.

A further object is to provide for the positive holding of the slide block in its released or operative position in order to insure firm contact with the stationary circuit closing unit or switch.

Other objects will in part be obvious and in part be pointed out hereinafter.

To the attainment of the aforesaid objects and ends, the invention still further resides in those novel details of construction, combination and arrangement of parts, all of which will be first fully described in the following detailed description, then be pointed out in the appended claims, reference being had to the accompanying drawing, in which:

Figure 1 is a side elevation of a portion of a vehicle showing the wheel unit and the fixedly located switch unit with which it cooperates.

Figure 2 is a diagram showing a signalling system with which my present improvements cooperate.

Figure 3 is an enlarged elevation of one of the wheel-carried units, the outer cover being removed and the parts being indicated in normal or "set" position in full lines and indicated in the released or operating position in dotted line.

Figure 4 is a section on the line 4—4 of Figure 3.

Figure 5 is a detail perspective view of the slide block.

Figure 6 is a detail perspective view of the latch plate looking at it from the front.

Figure 7 is a detail perspective view of the latch plate looking at it from the rear.

Figure 8 is a detail perspective view of the rocking shaft and finger.

Figure 9 is a front elevation of the casing, the rocking shaft, latch plate and slide block etc. being removed.

Figure 10 is an elevation of the new switch.

In the drawing, in which like numerals of reference indicate like parts in all the figures, 1 represents the casing which has a chamber 2, shaft bearings 5 and a guide hole 44 for the reception of the moving parts of the device. Guide studs 3—3 are provided which are carried by the rear wall and project into the chamber 2.

A spring-centering boss 4 also projects from the rear wall of the casing 1 and holes 6 are provided in the side walls of the casing for the screws 25 which secure the cover 24 to the casing 1 and the casing 1 to the wheel rim 31.

Journalled in the bearings 5 is a working shaft 7 having a flat portion 8 to which is secured, by a screw 10, a plate 9 constituting a finger for effecting a release of the latch.

The latch comprises a plate 11 of a form slidably to fit within the chamber 2 and having guide holes 15 so as to slide on the guide studs 3. A spring 16, held between the boss 4 and a boss 14 on the plate 11, serves constantly to urge the plate 11 forwardly against the finger 9 and toward the slide block 17.

The slide block 17 slidably fits in the chamber 2 and is held in place by the rod 21. The rod 21 passes through the guide hole 44 and is screwed into the threaded part of the hole 20 in which the block actuating spring 23 is held. The spring 23 also sets into a recess 22 in the casing 1. The block 17 has a pair of latching grooves 18 at its rod side and a similar pair of grooves at its spring side. These grooves 18 and 19 receive the heads of adjustable studs 12 screwed into the plate 11 and held by jamb nuts 13.

The ends of the shaft 7 project through the casing 1 and have secured thereto, by set screws 27 or other suitable means, hubs 26 carrying a loop 28 which comprises the latch releasing arm. This arm is bent at 29 to lie against the wheel rim 31 and have its extremity 30 projected to lie alongside the tire 32 but not in contact with it, so long as the tire remains properly inflated.

Suitably secured by the screw 35 to a fixed support (as the brake drum housing) is an insulation block 33 to which is secured a metal strap 36 having a terminal 37 for connection to the battery 38 of the signalling circuit. The screw 35 carries a pivoted circuit closer 34, which when turned in either direction from its mid-position will contact the strip 36 to close the circuit.

The signalling circuit disclosed in my patent aforesaid may be used. This circuit includes the indicator 39 having an annunciator armature 40 and magnet 41 for each wheel of the vehicle connected with the respective circuit closers 33 to 37 by the wires 42. It also includes a suitable signal 43 such as a bell, for example.

By the use of a circuit closer 33—37 of the kind shown in Figure 10 the circuit, once closed, remains closed until opened by the operator.

As the wheel turns, if the tire is properly inflated, it does not engage the end 30 of the arm 28. When the tire is under-inflated to a predetermined degree it will engage the end 30 and effect a rocking of the shaft 7 which causes finger 9 to press in the latch plate 11 to release block 17. The spring 23 then forces block 17 in a direction to project the rod 21 outwardly so it will engage switch finger 34 and move it over to engage strip 33 and close the circuit.

The distance which the studs 12 overlap the slide block is determined by the length of the actuator arm. The length of the arm varies with the sizes of tires and types of wheels, some of which have wider rims than others. The projected ends are adjusted so as to release the slide-block when the end of the actuation arm moves, say one-half inch, due to the deflection of the tire side caused by partial deflation.

The difference between the new switch herein described and that used in my patent aforesaid is that this one closes the circuit and leaves it closed until the switch is reset, while the old switch closed the circuit momentarily with each revolution of the wheel. The improved switch will close the circuit if the automobile moves either forwardly or backwardly when a tire is partially or wholly deflated.

If a tire becomes deflated when the car is parked there will be no closing of the switch before the car is moved, thus precluding the possibility of the circuit becoming closed and the battery run down when the car is parked over night or for other long periods.

What I claim is:

1. In a tire pressure indicator wherein is provided a fixedly located circuit closer actuated by a wheel-carried unit; a wheel-carried unit comprising a casing, a slide block mounted in the casing, a projectible member carried by the block and movable radially of the wheel, a latch plate mounted in and carried by a wall of the casing, means on the latch plate for latching the slide block in its retracted position and in its released position, a rocking shaft journalled in bearings in said casing and having a finger to press against the latch plate to retract it, a spring for urging the latch plate forwardly, and an arm on said rocking shaft to lie against the rim of the wheel and adjacent the tire for the purposes described.

2. In a tire pressure indicator wherein is provided a fixedly located circuit closer actuated by a wheel-carried unit; a wheel-carried unit comprising a casing, a slide block mounted in the casing, a projectible member carried by the block and movable radially of the wheel, a latch plate mounted in and carried by a wall of the casing, means on the latch plate for latching the slide block in its retracted position, a rocking shaft journalled in bearings in said casing, and having a finger to press against the latch plate to retract it, a spring for urging the latch plate forwardly, and an arm on said rocking shaft to lie against the rim of the wheel and adjacent but out of normal contact with the tire for the purposes described.

3. In a tire pressure indicator wherein is provided a fixedly located circuit closer actuated by a wheel-carried unit; a wheel-carried unit comprising a casing having a chamber, a slide block movable rectilinearly in said chamber, a rod carried by said block and projectible through a guide aperture in said casing for engaging the circuit closer, a spring continuously tending to move said block to project said rod, a latch plate carried by a wall of said casing and movable in said chamber in a direction transversely of the direction of movement of said slide block and having provisions to engage said slide block to hold it against the action of said spring, a second spring interposed between said latch plate and a wall of said casing continuously urging said latch plate toward its latching position, and tire actuated means to retract said latch plate to release said slide block.

4. In a tire pressure indicator wherein is provided a fixedly located circuit closer actuated by a wheel-carried unit; a wheel-carried unit comprising a casing having a chamber, a slide block movable rectilinearly in said chamber in a direction radial to the axis of the wheel, a rod carried by said block and projectible through a guide aperture in said casing for engaging the circuit closer, a spring continuously tending to move said block to project said rod, a latch plate carried by a wall of said casing and movable in said chamber in a direction parallel to the axis of the wheel and transversely of the direction of movement of said slide block and having provisions to engage said slide block to hold it against the action of said spring, a second spring continuously urging said latch plate toward its latching position, a rocking shaft journalled in bearings in said casing and having a finger within said chamber to engage said latch plate to move it for releasing said slide block.

5. In a tire pressure indicator wherein is provided a fixedly located circuit closer actuated by a wheel-carried unit; a wheel-carried unit comprising a casing having a chamber, a slide block movable rectilinearly in said chamber, a rod carried by said block and projectible through a guide aperture in said casing for engaging the circuit closer, a spring continuously tending to move said block to project said rod, a latch plate carried by a wall of said casing and movable in said chamber in a direction transversely of the direction of movement of said slide block and having provisions to engage said slide block to hold it against the action of said spring, a second spring continuously urging said latch plate toward its latching position, a rocking shaft journalled in bearings in said casing and having a finger within said chamber to engage said latch plate to move it for releasing said slide block, said latch plate and said slide block also having provisions to latch the slide block in its rod-projecting position.

6. In a tire pressure indicator wherein is provided a fixedly located circuit closer actuated by a wheel-carried unit; a wheel-carried unit comprising a casing having a chamber with parallel side walls, a slide block fitting within said chamber between said side walls, a projectible rod carried by said block, said casing having a guide hole for said rod to project through, said block having pairs of latching grooves, a latch plate also located in said chamber between said side walls to the rear of said slide block and mounted for movement toward and from said slide block, a spring pressing said latch plate toward said slide block, adjustable latching studs carried by said latch plate to cooperate with said pairs of grooves to latch said slide block in its retracted position and in its released position, guide studs carried by said casing for guiding said latch plate in its movements, and tire actuated means carried by said casing for moving said latch plate against its spring action to release said slide block for projecting said rod.

7. In a tire pressure indicator wherein is provided a fixedly located circuit closer actuated by a wheel-unit; a wheel-carried unit comprising a casing having a chamber with parallel side walls, a slide block fitting within said chamber between said side walls, a projectible rod carried by said block, said casing having a guide hole for said rod to project through, said block having pairs of latching grooves, a latch plate also located in said chamber between said side walls to the rear of said slide block and movable toward and from said slide block, a spring pressing said latch plate toward said slide block, adjustable latching studs carried by said latch plate to cooperate with said pairs of grooves to latch said slide block in its retracted position and in its released position, guide studs carried by said casing for guiding said latch plate in its movements, a rocking shaft journalled in bearings in said casing, and having a finger located in said chamber between said slide block and said latch plate for moving said latch plate to effect the release of said slide block, and means actuated by a tire of predetermined under inflation for working said shaft to move said latch plate.

8. In a tire pressure indicator wherein is provided a fixedly located circuit closer actuated by a wheel carried unit; a wheel-carried unit comprising a casing having a chamber with parallel side walls, a slide block fitting within said chamber between said side walls, a projectible rod carried by said block, said casing having a guide hole for said rod to project through, said block having pairs of latching grooves, a latch plate also located in said chamber between said side walls to the rear of said slide block and mounted for movement toward and from said slide block, a spring pressing said latch plate toward said slide block, adjustable latching studs carried by said latch plate to cooperate with said pairs of grooves to latch said slide block in its retracted position and in its released position, guide studs carried by said casing for guiding said latch plate in its movements, a rocking shaft journalled in bearings in said casing, and having a finger located in said chamber between said slide block and said latch plate for moving said latch plate to effect the release of said slide block, and an arm on said rocking shaft and shaped to lie against the wheel rim when in action and including a portion projecting into the path of the side wall of a partly deflated tire by which it is actuated to rock said shaft for releasing the latch plate from holding said slide block.

WALTER L. JONES.